United States Patent
Chiu et al.

(10) Patent No.: US 9,977,544 B2
(45) Date of Patent: May 22, 2018

(54) TOUCH DEVICE AND METHOD FOR FABRICATING THEREOF

(71) Applicant: TPK GLASS SOLUTIONS (XIAMEN) INC., Xiamen (CN)

(72) Inventors: Chien-Tai Chiu, Yongkang (TW); Yu-Xun Su, Yongkang (TW); Weijie Huang, Xiamen (CN); Qingwen Hu, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 709 days.

(21) Appl. No.: 13/781,752

(22) Filed: Mar. 1, 2013

(65) Prior Publication Data

US 2014/0247226 A1  Sep. 4, 2014
US 2017/0329432 A9  Nov. 16, 2017

(30) Foreign Application Priority Data

Mar. 1, 2012  (CN) .................... 2012 2 0075364 U

(51) Int. Cl.
| G09G 3/20 | (2006.01) |
| G06F 3/044 | (2006.01) |
| G06F 3/041 | (2006.01) |
| G06F 1/18 | (2006.01) |

(52) U.S. Cl.
CPC .............. *G06F 3/044* (2013.01); *G06F 1/181* (2013.01); *G06F 3/041* (2013.01); *G06F 2203/04103* (2013.01)

(58) Field of Classification Search
CPC ........... G06F 3/041; G06F 3/044; G06F 1/181

USPC .................... 345/173; 427/58, 595
See application file for complete search history.

(56) References Cited

U.S. PATENT DOCUMENTS

| 2009/0205879 A1* | 8/2009 | Halsey, IV et al. ........ 178/18.06 |
| 2009/0231301 A1* | 9/2009 | Chang et al. .................. 345/174 |
| 2011/0298750 A1* | 12/2011 | Wang .................... G06F 3/0412 345/174 |
| 2012/0026107 A1* | 2/2012 | Kim et al. .................... 345/173 |
| 2012/0106063 A1* | 5/2012 | Mathew et al. .......... 361/679.21 |

(Continued)

FOREIGN PATENT DOCUMENTS

| CN | 201174007 | 12/2008 |
| CN | 201622557 U | 11/2010 |
| JP | 2013178687 A * | 9/2013 |

*Primary Examiner* — Jonathan R Horner
(74) *Attorney, Agent, or Firm* — Cooper Legal Group, LLC

(57) ABSTRACT

The present disclosure relates to touch technology, and more particularly to a touch device and a method of fabricating the same. The disclosure provides a touch device comprising a protective cover having a sensing area and a peripheral area surrounding the sensing area; a first decoration layer disposed on the peripheral area; a sensing electrode layer comprising a sensing portion disposed on the sensing area and an extension portion extending from the sensing area to the first decoration layer; a second decoration layer disposed on the first decoration layer; a signal line formed on the second decoration layer and connected to the extension portion of the sensing electrode layer. By the design of the foregoing first and second decoration layers, the broken state or interruption of the sensing electrode layer can be prevented. In addition, the disclosure also provides the fabricating method for the foregoing touch device.

18 Claims, 5 Drawing Sheets

(56) References Cited

U.S. PATENT DOCUMENTS

| | | | |
|---|---|---|---|
| 2012/0113032 A1* | 5/2012 | Itakura | G06F 3/044 345/173 |
| 2012/0113042 A1* | 5/2012 | Bayramoglu et al. | 345/174 |
| 2013/0016052 A1* | 1/2013 | Lien et al. | 345/173 |
| 2013/0021289 A1* | 1/2013 | Chen et al. | 345/174 |
| 2013/0048837 A1* | 2/2013 | Pope et al. | 250/214.1 |
| 2013/0082961 A1* | 4/2013 | Wang et al. | 345/173 |
| 2013/0135233 A1* | 5/2013 | Wang et al. | 345/173 |
| 2014/0028928 A1* | 1/2014 | Yu et al. | 349/12 |
| 2014/0176826 A1* | 6/2014 | Kim et al. | 349/12 |

* cited by examiner

TOUCH DEVICE AND METHOD FOR FABRICATING THEREOF

BACKGROUND OF THE INVENTION

This Application claims the benefit of the People's Republic of China Application No. 201220075364.2, filed on Mar. 1, 2012.

FIELD OF THE INVENTION

The present disclosure relates to touch technology, and more particularly to a touch device and a fabricating method thereof.

DESCRIPTION OF THE RELATED ART

Touch panels have been widely used in the fields of household articles, communication devices and electronic devices. Presently, a touch panel combines with a display panel for forming a touch display panel permits direct selection of the images displayed on the panel with fingers or a stylus. Thereby, making it possible for the users to use the device conveniently. Such a touch panel reduces the volume of the device and replaces solid keyboard gradually as the input interface for various kinds of electronic products.

Generally, the sensing electrode layer of a touch panel is disposed on the sensing area of the touch panel, and the periphery of the sensing area is set with a decoration layer on which various circuits, for example, the signal lines for transmitting the signals of the sensing electrode layer, are disposed. The sensing electrode layer is usually a transparent electrode layer that enables users to observe the images on the display panel. The signal lines are generally non-transparent metallic wires, such as silver, copper etc., that have good signal transmission ability and low costs. In actual production process, the formation of a decoration layer on the substrate of a touch panel is usually previous to that of a sensing electrode layer, thus making the sensing electrode layer afterward having a portion of climbing slope extending toward the decoration layer. Subsequently, signal lines are then formed on the decoration layer and connected electrically to the sensing electrode layer for transmitting the signals of the sensing electrode layer to a processor.

The decoration layer acts like masking signal lines so as not to allow the user to sense the presence of signal lines. In addition, more thickness of the decoration layer is not advisable, as it becomes impossible for the sensing, electrode layer to climb smoothly up to the decoration layer to connect to the signal lines. Generally, the decoration layer have a thickness about 2-4 µm and are made of black materials with an optical density larger than 3. However, when the decoration layer of white or other colors is used in various designs, the thickness at least above 40 µm is necessary, so that the effect of masking signal lines can be attained. However, it becomes impossible for the sensing electrode layer to climb smoothly up to the decoration layer due to the overlarge angle of the interface generated by the decoration layer of such a thickness, causing the sensing electrode layer to break easily and thereby, resulting in an open circuit.

SUMMARY OF THE INVENTION

A touch device and a method of fabricating the same are provided by the present disclosure. On the peripheral area of the touch device, a decoration component is formed with non-black ink and is divided into two layers respectively having different areas and thicknesses, such that, it becomes unnecessary for the sensing electrode layer to climb onto the non-black thick decoration layer for connecting to the signal lines, thereby, reducing or preventing the broken state or interruption of the sensing electrode layer on its junction with the decoration layer, and further, settling the disconnection of the sensing electrode layer of a touch device.

According to one embodiment, a touch device, comprises: a protective cover having a sensing area and a peripheral area surrounding the sensing, area; a first decoration layer disposed on the peripheral area surrounding the sensing area; a sensing electrode layer containing a sensing portion disposed on the sensing area and an extension portion extending from the sensing area to the first decoration layer; a second decoration layer disposed on the first decoration layer; and a signal line formed on the second decoration layer and connected to the extension portion.

According to another embodiment of the disclosure, method of fabricating the touch device is provided. The method involves: forming a first decoration layer on a peripheral area of a protective cover, wherein the peripheral area surrounds a sensing area of the protective cover; forming a sensing electrode layer on the protective cover, wherein the sensing electrode layer comprises a sensing portion disposed on the sensing area and an extension portion extending from the sensing area to the first decoration layer; forming a second decoration layer on the first decoration layer; and forming a signal line on the second decoration layer, wherein the signal line is connected to the extension portion.

By the design of the first and second decoration layers, the broken state or interruption of the sensing electrode layer on its junction with the decoration layer can be prevented, and the disconnection of the sensing electrode layer of a touch device can further be settled.

In order to make the foregoing and other purposes, characteristics and advantages of the disclosure more conspicuously, the following content particularly lists preferable embodiments coupled with attached drawings to make a detailed description as follows:

BRIEF DESCRIPTION OF THE DRAWINGS

For those skilled in the art, numerous embodiments and drawings described below are for illustration purpose only, and not to limit the scope of the present disclosure in any manner.

DETAILED DESCRIPTION OF THE EMBODIMENTS

To provide a better understanding of the present disclosure to users skilled in the art, preferred embodiments are detailed as follows. The preferred embodiments of the present disclosure are illustrated in the accompanying drawings with numbered elements to clarify the contents and effects to be achieved.

Figure 1:
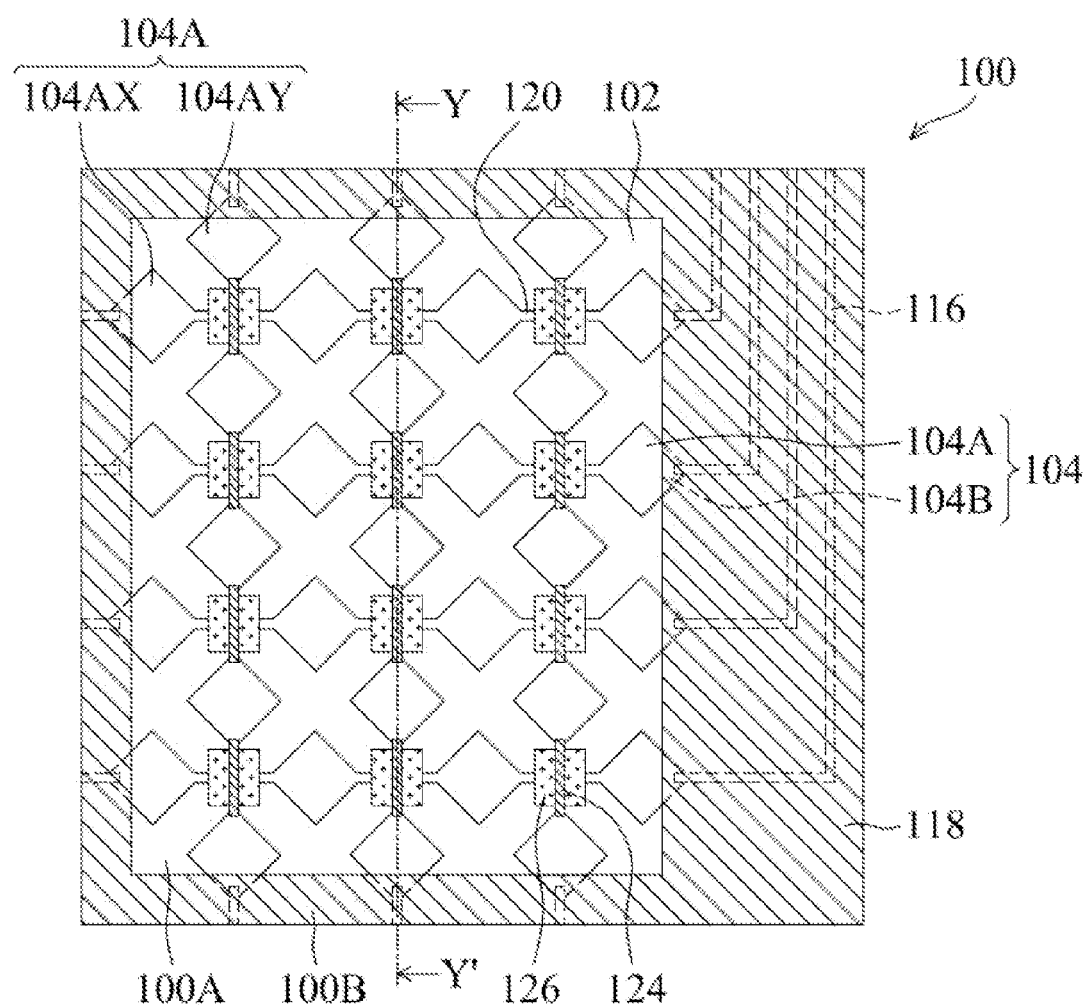
FIG. 1 is a top view of the touch device drawn in accordance with an embodiment the disclosure.
Figure 2:
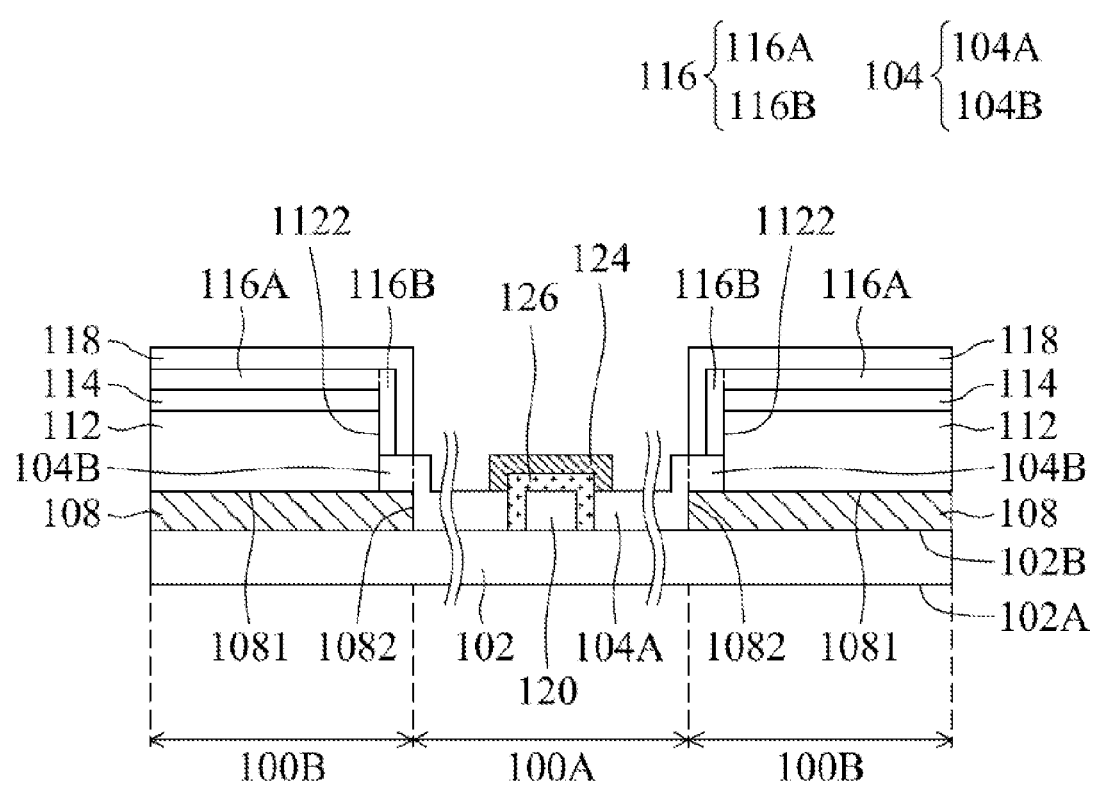
FIG. 2 is a cross-sectional schematic diagram of the touch device drawn along the cross-sectional line Y-Y' in FIG. 1.

FIG. 1 is a top view of the touch device in accordance with an embodiment of the disclosure. FIG. 2 is a cross-sectional schematic diagram of the touch device drawn along the cross-sectional line Y-Y' in FIG. 1. The touch device 100 may be a capacitive touch device but not limited thereto. The touch device 100 comprises a protective cover 102, a sensing electrode layer 104, a first decoration layer 108, a second decoration layer 112 and a signal line 116.

The protective cover 102 has a sensing area 100A and a peripheral area 100B surrounding the sensing area 100A, and provides protecting and supporting functions for the upper components (such as the sensing electrode layer 104, the first decoration layer 108, the second decoration layer 112 and the signal line 116 etc). The protective cover 102 can be a transparent substrate made of glass or plastic. The protective cover 102 has a first surface 102A and a second surface 102B, wherein the first surface 102A serves as a touch surface for the touch device 100, and the second surface 102B serves as a supporting surface for the sensing electrode layer 104, the first decoration layer 108 and the second decoration layer 112.

The sensing electrode layer 104 may include a sensing portion 104A and an extension portion 104B. The sensing portion 104A of the sensing electrode layer 104 is set in the sensing area 100A of the protective cover 102. The sensing portion 104A of the sensing electrode layer 104 may comprise a plurality of row-arranged first sensing electrodes 104AX and a plurality of column-arranged second sensing electrodes 104AY. Each of the two adjacent row-arranged first sensing electrodes 104AX are connected through the connecting lines 120, whereas the column-arranged second sensing electrodes 104AY are separated from each other. Each of the two adjacent column-arranged second sensing electrodes 104AY in a same column are electrically connected by a jumper line 124. An insulating layer 126 is set between each connecting line 120 and each jumper line 124, making the first sensing electrodes 104AX and the second sensing electrodes 104AY electrically insulated. Preferably, the sensing electrode layer 104 is arranged in a single-layer and double-axes form. However the pattern of the sensing electrode layer is not limited to this, and may include a single-layer and single-axis form or a double-layer and double-axes form. All these belong to the protection range of the disclosure as long as any changes or modifications are made in the spirit and scope of the disclosure. The sensing electrode layer can be made of any transparent electrode material such as indium tin oxide, indium zinc oxide, indium gallium oxide, indium gallium zinc oxide, nano-silver filament, nano-carbon tube, and graphene etc.

When the operator uses his finger or a stylus to touch the sensing area 100A of the first surface 102A of the protective cover 102, an inductive capacitance is generated between the finger (or the stylus) and the sensing portion 104A of the sensing electrode layer 104. The inductive capacitance is converted into an electric signal and the electric signal then is transmitted to an external circuit for calculating touch positions on the touch device 100.

The first decoration layer 108 may be set on the second surface 102B of the protective substrate 102 and in the peripheral area 100B. The first decoration layer 108 may be made of non-black ink such as one with an optical density less than 3. In an embodiment, the sensing electrode layer 104 includes an extension portion 104B extending from the sensing area 100A to the first decoration layer 108, that is, the first sensing electrodes 104AX and the second sensing electrodes 104AY can further extend to the first decoration layer 108 for forming the extension portion 104B of the sensing electrode layer 104. The sensing portion 104A of the sensing electrode layer 104 thereby contacts the lateral side 1082 of the first decoration layer 108, and the extension portion 104B covers a part of the upper surface 1081 of the first decoration layer 108. In an embodiment, the first decoration layer 108 may have a relatively less thickness about 2-6 µm. A relatively less thickness could make the gradient of the climbing slope necessary for the extension portion 104B extending towards the first decoration layer 108, thereby reducing or preventing the broken state or interruption of the sensing electrode layer 104 on its junction with the first decoration layer 108.

The second decoration layer 112 may be set in the peripheral area 100B and on the first decoration layer 108. The second decoration layer 112 can cover most of the peripheral area 100B and surround the sensing area 100A. There exists a distance between the sensing area 100A and the second decoration layer 112, making it possible for the extension portion 104B of the sensing electrode layer 104 to extend towards the upper surface 1081 of the first decoration layer 108, that is, the second decoration layer 112 and the first decoration layer 108 have different areas. In an embodiment, the second decoration layer 112 contacts the extension portion 104B, for example, by aligning to or covering a part of the extension portion 104B. In an embodiment, the second decoration layer 112 can have a relatively more thickness (compared with the first decoration layer 108), for example, about 4-100 µm or about 8-30 µm for providing the primary masking function. The second decoration layer 112 may be made of the same material as of the first decoration layer 108, for example, of a non-black ink with an optical density less than 3. In an embodiment, the first decoration layer 108 is same as the second decoration layer in color, for example, formed by white-color ink layer. In another embodiment, the first decoration layer 108 and the second decoration layer 112 may also be made of non-black inks of different colors.

The signal line 116 may be formed on the second decoration layer 112 and is connected to the extension portion 104B of the sensing electrode layer 104. The signal line 116 can comprise a first portion 116A located on the upper surface of the second decoration layer 112 and electrically connected to other circuit devices (not shown) such as a signal processor, and a second portion 116B extending from the first portion 116A to cover a lateral side 1122 of the second decoration layer 112 near the sensing area 100A and to connect to the extension portion 104B of the sensing electrode layer 104 for receiving the signals from the sensing electrode layer 104. This enables the capacitance changes induced by the sensing portion 104A of the sensing electrode layer 104 to be transmitted to the signal processor of the touch device 100 (not shown) via the signal line 116 for the calculation of touch signals. In another embodiment, a protective layer 118 covering the second decoration layer 112, the first portion 116A and second portion 116B of the signal line 116 could be formed. The protective layer 118 could further provide the effect of masking and protecting the signal line 116 from the influence of an external force that causes signal line 116 to break or interrupt. The protective layer 118 may be made of non-black ink, and may be formed by photoetching or screen-printing process. The protective layer 118 may be formed by the same or different-color inks used in fabricating the first decoration layer 108 and the second decoration layer 112. In addition, in an alternate embodiment, the touch device 100 may further comprise a passivation layer (not shown) to entirely cover all the components set on the second surface 102B of the protective cover 102 for protecting these components and providing a flat surface for the attachment of a display panel.

In an alternate embodiment, the third decoration layer 114 is necessarily formed on the second decoration layer 112, for example, on the position between the first portion 116A of the signal line 116 and the second decoration layer 112. Under the circumstance of forming the third decoration layer 114, the signal line 116 can be formed on the third decoration layer 114, and the protective layer 118 formed subsequently may cover the third decoration layer 114 and the signal line 116. The third decoration layer 114 may have a relatively high optical density, for example, an optical density larger than 3. When the first decoration layer 108 and the second decoration layer 112 are insufficient to serve as masking function (if both of them give poor masking effect in white-color state), the third decoration layer 114 can be applied to attaining the necessary masking effect. The thickness of the third decoration layer 114 may be about 1~10 µm.

The first decoration layer and the second decoration layer in the foregoing embodiment are designed to have different areas and thicknesses, making it possible for the sensing electrode layer to climb up only a small distance of height (2-6 µm), same as the thickness of the conventional black ink layer but less than the thickness of conventional non-black ink decoration layer (larger than 40 µm), whereas the second decoration layer has a relatively more thickness compared with that of the first decoration layer to provide the effect of masking the signal line. Therefore, the signal line can be masked, also the chances for the broken state or interruption of the sensing electrode layer on its junction with a non-black decoration layer can be reduced or prevented. The touch device provided by such an embodiment of the disclosure can have various non-black frames of different colors, and can enrich the possibilities in design and promote the enjoyment, meanwhile, can still maintain the characteristics of being light in weight and less in thickness. However, it is known to a person skilled in the art that the areas, thicknesses and optical densities of various decoration layers can be varied based on the applications of the disclosure.

FIGS. 3A-3E are cross-sectional schematic diagrams of the intermediate stage in fabricating a touch device in accordance with the embodiment of the disclosure. Initially in FIG. 3A, a protective cover 102 is provided having a first surface 102A, as a touch surface, and a second surface 102B on which a first decoration layer 108 is formed. The area of the protective cover 102 may be delimited as a sensing area 100A and a peripheral area 100B surrounds the sensing area 100A. Other properties of the protective cover 102 are same as the foregoing embodiment, which will not be repeated again. The first decoration layer 108 set in the peripheral area 100B may be formed by any of non-black inks with optical densities less than 3 and in various ways such as by an initial deposition process followed by patterning process via photoetching or screen-printing process. Other properties of the first decoration layer 108 are same as the foregoing embodiment, which will not be repeated hereby.

Figure 3A:
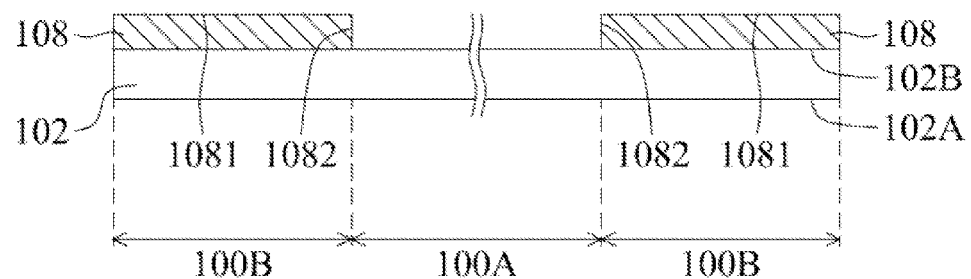
FIGS. 3A-3E are cross-sectional schematic diagrams of the intermediate stage in the fabrication of a touch device in accordance with an embodiment of the disclosure.
Figure 3B:
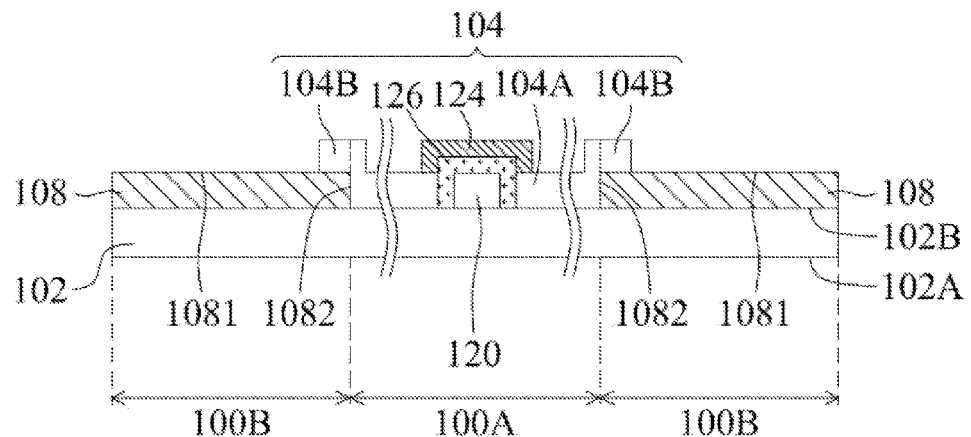

Referring to FIG. 3B, this step involves forming a sensing electrode layer 104, wherein most part of the sensing electrode layer 104 is formed on part of the second surface 102B of the protective cover 102 and small part of sensing electrode layer 104 is formed on part of the first decoration layer 108. The sensing electrode layer 104 comprises a sensing portion 104A in the sensing area 100A and a extension portion 104B extending from the sensing area 100A to the first decoration layer 108. The sensing portion 104A of the sensing electrode layer 104, located in the sensing area 100A, can be patterned by photoetching or printing in a manner as of the first sensing electrodes 104AX and the second sensing electrodes 104AY arranged in row and column as shown in FIG. 1. As for the sensing portion 104A of the sensing electrode layer 104 as shown in FIG. 1, each of the two adjacent first sensing electrodes 104AX are connected by a connecting line 120, whereas the second sensing electrodes 104AY are separated mutually. The first sensing electrodes 104AX and the second sensing electrodes 104AY respectively extend from the sensing area 100A to the upper surface 1081 of the first decoration layer 108 along a lateral side 1082 of the first decoration layer 108, so as to form the extension portion 104B. Due to an extremely less thickness of the first decoration layer 108 (about 2-6 µm), the gradient of the climbing slope for the sensing electrode layer 104 is relatively small, and the chances for the broken state or interruption of the sensing electrode layer 104 on its junction with the first decoration layer 108 can be reduced or prevented. Other properties of the sensing electrode layer 104 are same as the foregoing embodiment, which will not be repeated hereby. In addition, an insulating layer 126 is further formed on the sensing electrode layer 104. The insulating layer 126 is formed on the connecting line 120 to insulate the first sensing electrodes 104AX from the second sensing electrodes 104AY. Subsequently, jumper lines 124 are formed on the insulating layer 126 to electrically connect each of the two adjacent second sensing electrodes 104AY.

Figure 3C:
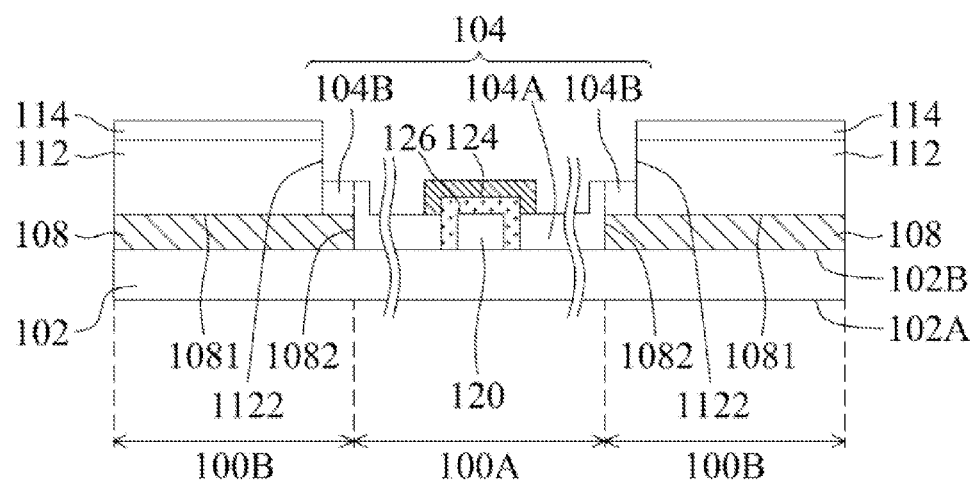

Referring to FIG. 3C, after the sensing components in the sensing area 100A (for example, the sensing electrode layer 104A, the jumper line 124, the insulating layer 126 etc.) have been formed, a second decoration layer 112 is formed on the first decoration layer 108. Depending upon the requirements, a third decoration layer 114 could be formed on the second decoration layer 112. In an embodiment, the second decoration layer 112 and/or the third decoration layer 114 can be formed before the formation of the above-mentioned sensing components. In an embodiment, the second decoration layer 112 contacts the extension portion 104B, for example, by aligning to or covering a part of the extension portion 104B. In an embodiment, the second decoration layer 112 can be made of the same material and by the same manufacture process as the first decoration layer 108, with a relatively more thickness than the first decoration layer 108, for example, about 4-100 µm or about 8-30 µm. The second decoration layer 112 and/or the third decoration layer 114 can be formed in the same manufacture process as the first decoration layer 108. Once this process is completed, chemical and mechanical grinding can be performed on the second decoration layer 112 and/or the third decoration layer 114 to remove the extremely thick part of the second decoration layer 112 and/or the third decoration layer 114, and provide a flat surface for the setting of the signal line 116 (referring to FIG. 3D). The second decoration layer 112 can be made of any of non-black inks with optical densities less than 3, and can be of the same or different color as of the first decoration layer 108. Other properties of the second decoration layer 112 and the third decoration layer 114 are same as the foregoing embodiment, which will not be repeated hereby.

Figure 3D:
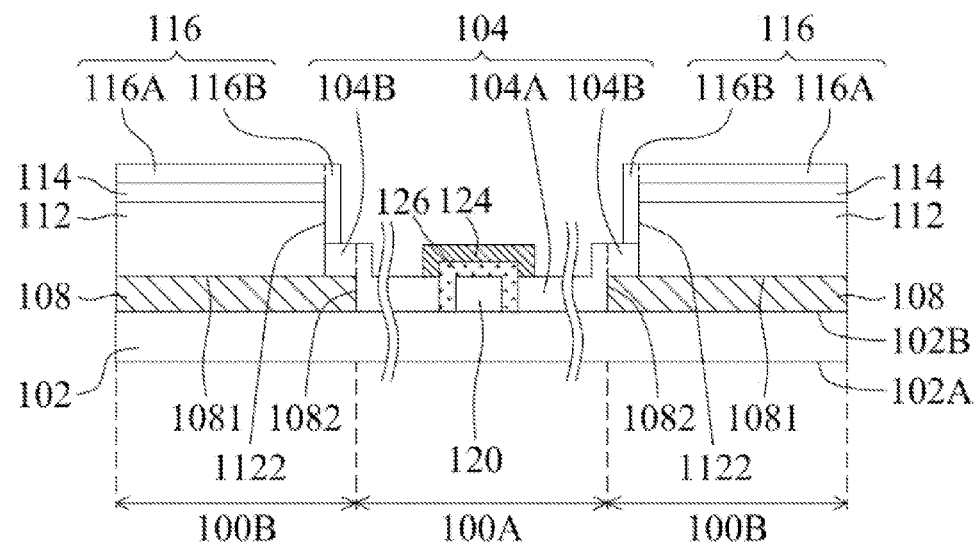

With reference to FIG. 3D, the signal line 116 is formed on the second decoration layer 112 (or the third decoration layer 114), for example, on the upper surface and the lateral side 1122 of the second decoration layer 112, wherein the signal line 116 is connected to the extension portion 104B of the sensing electrode layer 104. The signal line 116 may be made of metallic material, and can be patterned by photoetching or printing so as to have the corresponding patterns to those shown in FIG. 1. In addition, the signal line 116 may include a first portion 116A located on the upper surface of the second decoration layer 112 (or the third decoration layer 114) and electrically connected to other circuit devices of the touch device 100, such as signal processor; and a second portion 116B, extending from the first portion 116A along the lateral side 1122 of the second decoration layer 112, to be connected with the extension portion 104A of the sensing electrode layer 104 for transmitting the capacitance changes induced by the sensing portion 104A of the sensing electrode layer 104 to the signal processor (not shown) of the touch device 100 so as to conduct the touch-signal calculation. In another embodiment, the jumper line 124 and the signal line 116 are formed simultaneously.

Figure 3E:
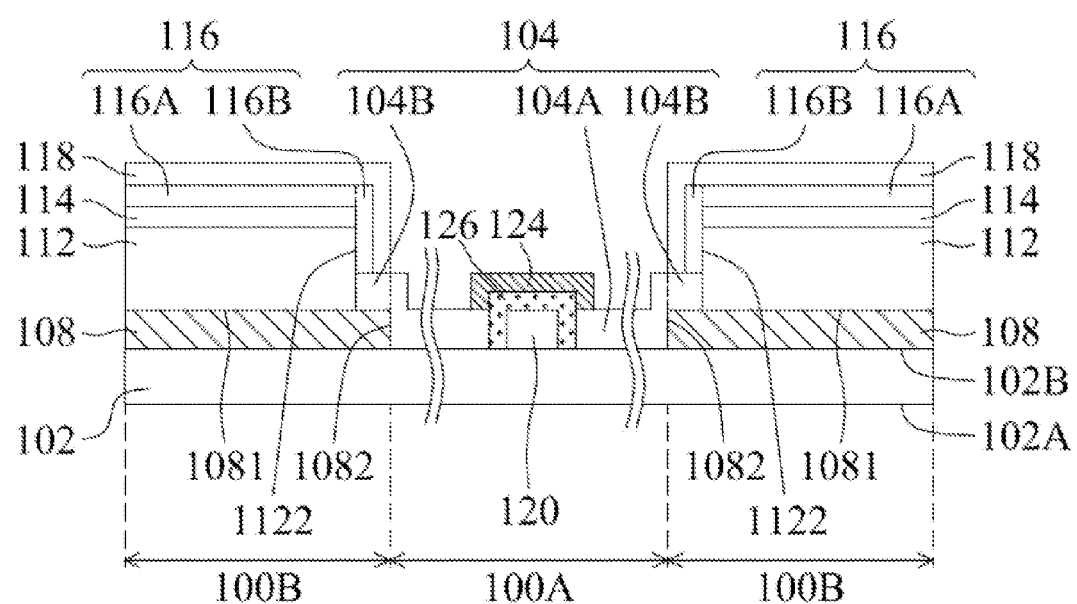

With reference to FIG. 3E, a protective layer 118 can be formed on the second decoration layer 112 (or the third decoration layer 114) and the signal line 116, for example, by covering the first portion 116A and the second portion 116B of the signal line 116, to further provide the effect of masking and protecting the signal line 116 from the influence of an external force. The protective layer 118 can be formed by photoetching or screen-printing by the same-color ink as or a different-color ink than of the first decoration layer 108 and the second decoration layer 112. In an alternate embodiment, a passivation layer (not shown) can be further formed to cover all the components of the second surface 102B for making physical protection and serving as a basically flat surface. By these method steps, the main fabrication of touch panel is completed, and the touch device 100 is formed accordingly. Subsequently, if there is any need, a display panel can be further attached to the passivation layer.

Therefore, in the steps as shown in FIGS. 3A-3E, all various components shown in FIG. 1 and FIG. 2 are formed, but the pattern of the sensing electrode layer 104 is not limited to that in single-layer and double-axes shape. According to different shapes of the sensing electrode layers 104, the insulating layer 124 and the jumper line 126 can also be non-essential components, for example, the pattern of the sensing electrode layer may be designed in single-layer and single-axis shape or in double-layer and double-axes shape. All these belong to the protection range of the disclosure as long as any changes and modifications are made in the spirit and scope of the disclosure.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A touch device, comprising:
   a protective cover having a sensing area and a peripheral area surrounding the sensing area;
   a first decoration layer disposed on the peripheral area;
   a second decoration layer disposed on the first decoration layer;
   a transparent sensing electrode layer comprising a sensing portion disposed on the sensing area and an extension portion extending from the sensing area to the upper surface of the first decoration layer; and
   a non-transparent signal line comprising a first portion and a second portion, wherein: the first portion of the non-transparent signal line is overlies the second decoration layer, and the second portion of the non-transparent signal line extends from the first portion of the non-transparent signal line along a lateral side of the second decoration layer to contact the extension portion of the transparent sensing electrode layer on the upper surface of the first decoration layer.

2. The touch device of claim 1, wherein the second decoration layer is thicker than the first decoration layer.

3. The touch device of claim 1, wherein the first decoration layer is 2-6 μm thick.

4. The touch device of claim 1, wherein the first decoration layer and the second decoration layer are made of non-black inks.

5. The touch device of claim 1, wherein the non-transparent signal line and the transparent sensing electrode layer interface at a location along the lateral side of the second decoration layer.

6. The touch device of claim 1, further comprising: a third decoration layer disposed between the first portion of the non-transparent signal line and the second decoration layer to mask the first portion of the non-transparent signal line.

7. The touch device of claim 1, further comprising: a protective layer in contact with an upper surface of the first portion of the non-transparent signal line, a lateral side of the second portion of the non-transparent signal line and an upper surface of the extension portion of the transparent sensing electrode layer.

8. The touch device of claim 1, wherein:
   the sensing portion of the transparent sensing electrode layer comprises a plurality of row-arranged first sensing electrodes and a plurality of column-arranged second sensing electrodes, and
   a first sensing electrode of the plurality of row-arranged first sensing electrode is connected through a connecting line to a second sensing electrode of the plurality of the row-arranged first sensing electrodes.

9. The touch device of claim 8, further comprising:
   a jumper line electrically connecting a first sensing electrode of the plurality of the column-arranged second sensing electrodes to a second sensing electrode of the plurality of column-arranged second sensing electrodes; and
   an insulating layer disposed between the connecting line and the jumper line to insulate the connecting line from the jumper line.

10. A method of fabricating a touch device, comprising:
    forming a first decoration layer on a peripheral area of a protective cover, wherein the peripheral area surrounds a sensing area of the protective cover;
    forming a second decoration layer on the first decoration layer;
    forming a transparent sensing electrode layer on the protective cover, wherein the transparent sensing electrode layer comprises a sensing portion disposed on the sensing area and an extension portion extending from the sensing area to the upper surface of the first decoration layer; and
    forming a non-transparent signal line comprising a first portion and a second portion, wherein; the first portion of the non-transparent signal line is formed over the second decoration layer to overlie the second decoration layer, and the second portion of the non-transparent signal line extends from the first portion of the non-transparent signal line along a lateral side of the second decoration layer to contact the extension portion of the transparent sensing electrode layer on the upper surface of the first decoration layer.

11. The method of fabricating a touch device of claim 10, further comprising: forming a third decoration layer prior to forming the non-transparent signal line, wherein the third decoration layer masks the first portion of the non-transparent signal line.

12. The method of fabricating a touch device of claim 10, further comprising: forming a protective layer to cover the second decoration layer and the non-transparent signal line, wherein the protective layer extends along a later side of the second portion of the non-transparent signal line.

13. The method of fabricating a touch device of claim 10, wherein the sensing portion of the transparent sensing electrode layer comprises a plurality of row-arranged first sensing electrodes and a plurality of column-arranged second sensing electrodes, and a first sensing electrode of the plurality of row-arranged first sensing electrode is connected through a connecting line to second sensing electrodes of the plurality of the row-arranged first sensing electrodes.

14. The method of fabricating a touch device of claim 13, w further comprising:
  forming an insulating layer on the connecting line; and
  forming a jumper line on the insulating layer to connect a first sensing electrode of the plurality of the column-arranged second sensing electrodes to a second sensing electrode of the plurality of column-arranged second sensing electrodes.

15. The touch device of claim 1, wherein the sensing portion of the transparent sensing electrode layer contacts a lateral side of the first decoration layer, the extension portion of the transparent sensing electrode layer covers a first part of the upper surface of the first decoration layer, and the second decoration layer is mainly disposed on a second part of the upper surface of the first decoration layer.

16. The touch device of claim 15, wherein the second decoration layer contacts the extension portion of the transparent sensing electrode layer by covering a part of the extension portion of the transparent sensing electrode layer.

17. The method of fabricating a touch device of claim 10, wherein: forming the transparent sensing electrode layer comprises forming the transparent sensing electrode layer in a manner such that the sensing portion of the transparent sensing electrode layer contacts a lateral side of the first decoration layer and such that the extension portion of the transparent sensing electrode layer covers a first part of the upper surface of the first decoration layer, and forming the second decoration layer comprises forming the second decoration layer i in a manner such that the second decoration layer is mainly disposed on a second of the upper surface of the first decoration layer.

18. The method of fabricating a touch device of claim 17, wherein forming the second decoration layer comprise forming the second decoration layer in a manner such that the second decoration layer contacts the extension portion of the transparent sensing electrode by covering a part of the extension portion of the transparent sensing electrode layer.

* * * * *

UNITED STATES PATENT AND TRADEMARK OFFICE
CERTIFICATE OF CORRECTION

PATENT NO.        : 9,977,544 B2
APPLICATION NO.   : 13/781752
DATED             : May 22, 2018
INVENTOR(S)       : Chien-Tai Chiu et al.

Page 1 of 1

It is certified that error appears in the above-identified patent and that said Letters Patent is hereby corrected as shown below:

On the Title Page

In item (73) titled Assignee: please delete "TPK Touch Solutions (Xiamen) Inc." and insert therefor --TPK Glass Solutions (Xiamen) Inc.--

Signed and Sealed this
Fifth Day of March, 2019

Andrei Iancu
*Director of the United States Patent and Trademark Office*